(12) United States Patent
Schumann et al.

(10) Patent No.: US 11,536,939 B2
(45) Date of Patent: Dec. 27, 2022

(54) METHOD FOR DIGITALLY CORRECTING AN OPTICAL IMAGE OF A SAMPLE BY MEANS OF A MICROSCOPE, AND MICROSCOPE

(71) Applicant: Leica Microsystems CMS GmbH, Wetzlar (DE)

(72) Inventors: Christian Schumann, Lich (DE); Tobias Bauer, Koenigstein/Ts (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/285,104

(22) PCT Filed: Oct. 18, 2019

(86) PCT No.: PCT/EP2019/078319
§ 371 (c)(1),
(2) Date: Apr. 14, 2021

(87) PCT Pub. No.: WO2020/079206
PCT Pub. Date: Apr. 23, 2020

(65) Prior Publication Data
US 2021/0373307 A1 Dec. 2, 2021

(30) Foreign Application Priority Data
Oct. 19, 2018 (DE) .................. 10 2018 125 997.2

(51) Int. Cl.
*G02B 21/00* (2006.01)
*G06T 5/00* (2006.01)
*G06T 5/20* (2006.01)

(52) U.S. Cl.
CPC ............ *G02B 21/008* (2013.01); *G06T 5/006* (2013.01); *G06T 5/20* (2013.01); *G06T 2207/10056* (2013.01)

(58) Field of Classification Search
None
See application file for complete search history.

(56) References Cited

U.S. PATENT DOCUMENTS

| 7,489,828 B2 | 2/2009 | Asad et al. |
| 2005/0083517 A1* | 4/2005 | Asad .................. G02B 21/365 |

(Continued)

FOREIGN PATENT DOCUMENTS

| DE | 10250775 A1 | 6/2003 |
| DE | 102017105928 A1 | 9/2018 |
| EP | 1988417 A1 | 11/2008 |

OTHER PUBLICATIONS

Z. Kam, B. Hanser, M. G. L. Gustafsson, D. A. Agard, J. W. Sedat; "Computational adaptive optics for live three-dimensional biological imaging;" Proceedings of the National Academy of Sciences 98 (7), Mar. 2001, pp. 3790-3795, NAS, US.

(Continued)

*Primary Examiner* — Christopher G Findley
(74) *Attorney, Agent, or Firm* — Leydig, Voit & Mayer, Ltd.

(57) ABSTRACT

A method is useable for digitally correcting an optical image of a sample by a microscope that has a cover slip covering the sample. The method includes: determining, by the microscope, an index of refraction of an optical medium bordering the cover slip, a tilt of the cover slip, and/or a thickness of the cover slip; ascertaining an imaging error to be corrected in the form of a pupil function based on the index of refraction of the optical medium, the tilt of the cover slip, and/or the thickness of the cover slip; carrying out imaging of the sample by the microscope; and digitally correcting image data captured by the imaging of the sample based on the pupil function.

12 Claims, 2 Drawing Sheets

(56) References Cited

U.S. PATENT DOCUMENTS

| | | |
|---|---|---|
| 2005/0265621 A1 | 12/2005 | Biggs et al. |
| 2009/0213717 A1 | 8/2009 | Matsuzaki et al. |
| 2017/0178317 A1 | 6/2017 | Besley et al. |
| 2018/0018758 A1 | 1/2018 | Lutz |
| 2018/0061019 A1* | 3/2018 | Wachi .................. G06T 5/20 |
| 2020/0110254 A1* | 4/2020 | Goegler ................ G02B 21/02 |

OTHER PUBLICATIONS

Hiraoka Y, Sedat JVV, Agard DA. "Determination of three-dimensional imaging properties of a light microscope system: Partial confocal behavior in epifluorescence microscopy." Biophys J. 57(2), Feb. 1990, pp. 325-333, Biophysical Society, US.

P. Török et al., "Electromagnetic diffraction of light focused through a planar interface between materials of mismatched refractive indices: an integral representation", J. Opt. Soc. Am. A 12 (Feb. 1995), pp. 325-332, Optical Society of America, US.

S. Stallinga, "Compact description of substrate-related aberrations in high numerical-aperture optical disk readout", Appl. Opt. 44 (Feb. 20, 2005), pp. 849-858, Optical Society of America, US.

D. Paganin, K. A. Nugent, "Non-interferometric Phase Imaging with Partially Coherent Light", Phys. Rev. Lett. 80 (Mar. 23, 1998), pp. 2586-2589, American Physical Society, US.

M. Mir et al., "Quantitative Phase Imaging", Progress in Optics 57 (Jul. 31, 2012), pp. 133-217, Elsevier B.V., Netherlands.

M. Chen et al., "3D differential phase contrast microscopy", Biomed. Opt. Express 7 (Oct. 1, 2016), pp. 3940-3950, Optical Society of America, US.

J. Pawley, "Handbook of biological confocal microscopy", 3rd edition, Chapter 25, Springer, USA, Dec. 2006, ISBN 978-0-387-25921-5, pp. 488-501.

M. Leutenegger et al., "Fast focus field calculations", Opt. Express 14 (Nov. 13, 2006), pp. 11277-11291, The Optical Society, US.

* cited by examiner

METHOD FOR DIGITALLY CORRECTING AN OPTICAL IMAGE OF A SAMPLE BY MEANS OF A MICROSCOPE, AND MICROSCOPE

CROSS-REFERENCE TO PRIOR APPLICATIONS

This application is a U.S. National Phase Application under 35 U.S.C. § 371 of International Application No. PCT/EP2019/078319, filed on Oct. 18, 2019, and claims benefit to German Patent Application No. DE 10 2018 125 997.2, filed on Oct. 19, 2018. The International Application was published in German on Apr. 23, 2020, as WO 2020/079206 under PCT Article 21(2).

FIELD

The invention relates to a method for digitally correcting an optical image of a sample by means of a microscope, wherein the microscope has a cover slip covering the sample. The invention furthermore relates to a microscope having a device for digitally correcting an optical image of a sample.

BACKGROUND

The main influence on the quality of a light-microscopy image of a sample are sample-related imaging errors. These may typically be determined with the aid of special measurement methods. For this purpose, methods for deconvolution of image data obtained in fluorescence microscopy with the aid of computer programs are known from the prior art. In these known methods, in particular aspheric error induced by index of refraction mismatch is taken into consideration. The known methods have the disadvantage that it is left to an operator to ascertain the items of information required for determining the index of refraction mismatch and supply them to the computer program. Furthermore, a tilt of the cover slip is not taken into consideration in the known methods.

SUMMARY

In an embodiment, the present invention provides a method for digitally correcting an optical image of a sample by a microscope that has a cover slip covering the sample. The method includes: determining, by the microscope, an index of refraction of an optical medium bordering the cover slip, a tilt of the cover slip, and/or a thickness of the cover slip; ascertaining an imaging error to be corrected in the form of a pupil function based on the index of refraction of the optical medium, the tilt of the cover slip, and/or the thickness of the cover slip; carrying out imaging of the sample by the microscope; and digitally correcting image data captured by the imaging of the sample based on the pupil function.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
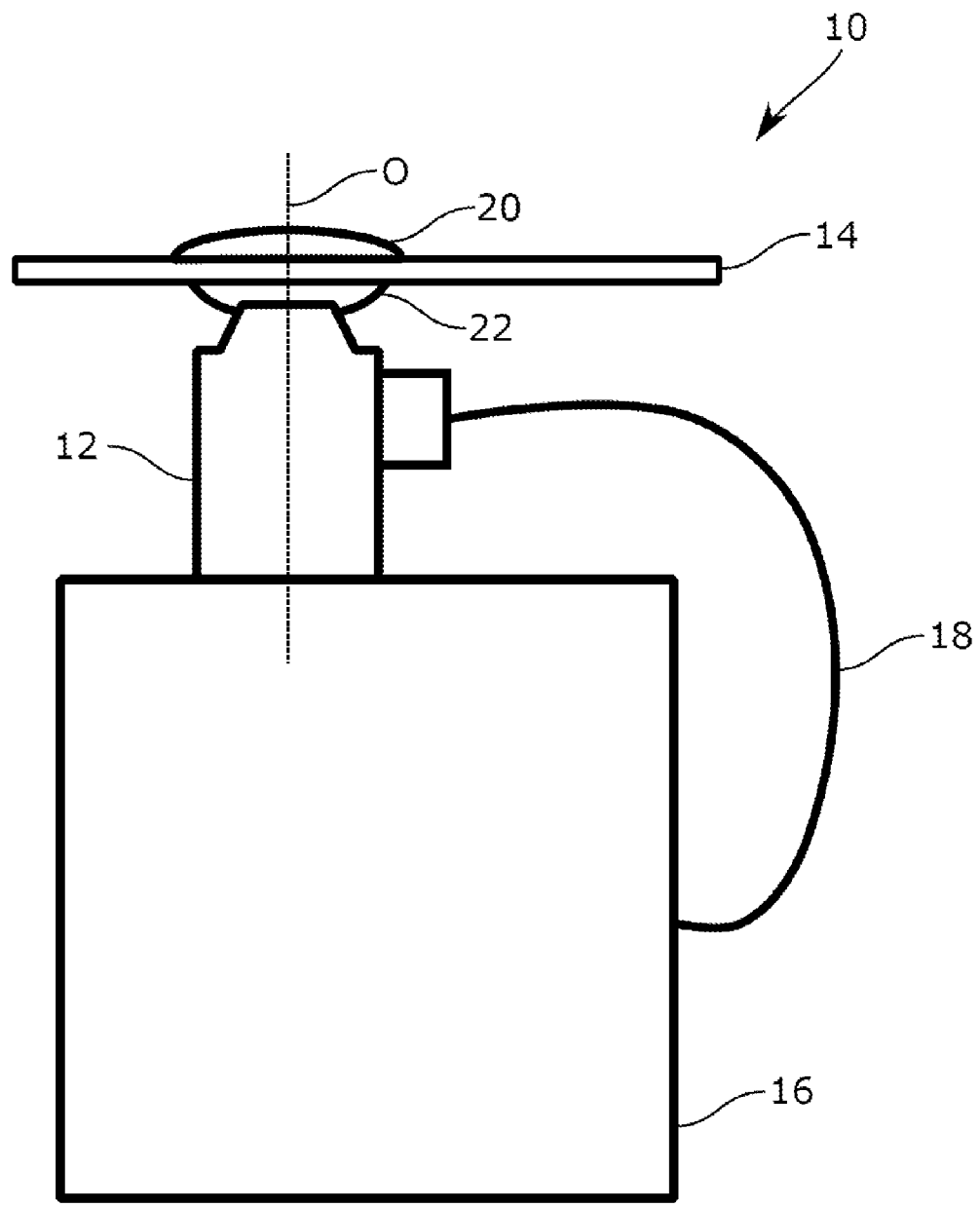
FIG. 1 shows a schematic illustration of a microscope as an exemplary embodiment.

Embodiments of the invention provide a method for digitally correcting an optical image of a sample by means of a microscope and a microscope having a device for digitally correcting an optical image of a sample, which enable a correction of the image in consideration of measurable properties of the sample and the sample chamber.

In the method according to an embodiment of the invention for digitally correcting an optical image of a sample by means of a microscope, wherein the microscope has a cover slip covering the sample, the index of refraction of an optical medium bordering the cover slip, a tilt of the cover slip, and/or the thickness of the cover slip are determined by the microscope, an imaging error to be corrected is ascertained in the form of a pupil function on the basis of the index of refraction of the optical medium, the tilt of the cover slip, and/or the thickness of the cover slip, the sample is imaged by the microscope and imaging data captured by the imaging of the sample are digitally corrected on the basis of the pupil function.

According to an embodiment of the invention, properties of the sample to be imaged and the sample chamber are determined by the microscope. The imaging error is then ascertained from the properties determined by the microscope. This is advantageous over known methods in which the imaging error is ascertained ex-situ, for example with the aid of a reference preparation, since no correlation can be ensured here between the imaging error ascertained with the aid of the reference preparation and the imaging error during the imaging of the sample.

The imaging error is ascertained, for example, by modeling a wavefront error from the properties of the sample and the sample chamber ascertained by the microscope. Models for calculating a wavefront error based on properties of the sample and the sample chamber are known, for example, from P. Torok et al., "Electromagnetic diffraction of light focused through a planar interface between materials of mismatched refractive indices: an integral representation", J. Opt. Soc. Am. A 12 (1995), 325-332 or from S. Stallinga, "Compact description of substrate-related aberrations in high numerical-aperture optical disk readout", Appl. Opt. 44 (2005), 849-858.

The imaging error can be determined as a pupil function of an objective from the index of refraction of the optical medium bordering the cover slip and the thickness of the cover slip as $$\psi(r) = z\sqrt{n_{Spc}^2 - r^2 NA^2} + \Delta d\sqrt{n_{Dgl}^2 - r^2 NA^2} - (z+\Delta d)\sqrt{n_{Imm}^2 - r^2 NA^2}$$

In this case, r is a radial coordinate of the exit pupil of the objective scaled to the unit circle, z is a mechanical focal length, $n_{Spc}$ is the index of refraction of the optical medium bordering the cover slip, $n_{Imm}$ is the known index of refraction of a further optical medium introduced between the objective and the cover slip, for example air or an immersion oil, $\Delta d$ is a deviation of the cover slip thickness along the optical axis of the objective from the nominal cover slip thickness, and NA is the numerical aperture of the objective.

The essential properties of the imaging, i.e., the imaging behavior of the optical system formed by sample, sample chamber, and microscope, are contained in the pupil function. Therefore, sample properties, for example a spatial distribution of fluorophores or an index of refraction distribution, can be reconstructed from image data obtained by the imaging on the basis of the pupil function. This enables a correction of the imaging.

The optical medium is in particular an embedding medium in which the sample is embedded. Furthermore, an immersion medium is arranged between the objective of the microscope and the cover slip. The imaging error to be corrected is ascertained on the basis of the known index of refraction of the immersion medium.

In one preferred embodiment, a digital filter for correcting the image data captured by the imaging of the sample is generated on the basis of the pupil function. This is the simplest way for a correction of the image data captured during the imaging of the sample. By applying the digital filter to the image data captured by the imaging of the sample, an inversion of the imaging by the optical system formed by the sample, sample chamber, and microscope quasi takes place, whereby the imaging errors induced by properties of the sample and the sample chamber can be removed from the image data captured by the imaging of the sample.

In one advantageous refinement, phase information of detection light emitted by the sample is reconstructed with the aid of the digital filter. So-called inverse filters for quantitative phase reconstruction methods can result from the pupil function. Quantitative phase reconstruction methods are, for example, imaging methods based on the transport of intensity equation, for example as described in D. Paganin, K. A. Nugent, "Noninterferometric Phase Imaging with Partially Coherent Light", Phys. Rev. Lett. 80 (1998), 2586, coherent interference microscopy, which is described, for example in M. Mir et al., "Quantitaive Phase Imaging", Progress in Optics 57 (2012), 133-217, or differential phase contrast microscopy, which is described, for example in M. Chen et al., "3D differential phase contrast microscopy", Biomed. Opt. Express 7 (2016), 3940-3950. Samples which absorb little light, so-called phase objects, may also be imaged by the reconstruction of phase information.

An image of a plane lying in the sample is preferably generated by the imaging and the image is corrected by an inversion of the imaging on the basis of the pupil function. In the case of light microscopy imaging of the plane lying in the sample, the image data are in particular a two-dimensional matrix consisting of pixels. A digital filter ascertained from the pupil function is applied to the image data for inversion of the imaging by the microscope.

In one preferred embodiment, a point spread function is generated on the basis of the pupil function and a deconvolution operation is performed by means of the point spread function on the imaging data captured by the imaging of the sample to correct the imaging. The point spread function specifies how an ideal punctiform object is imaged by the microscope. It can therefore be used in particular for the deconvolution of image data obtained in fluorescence microscopy, for example as described in Chapter 25, J. Pawley, "Handbook of biological confocal microscopy", 3rd edition, Springer, ISBN 978-0-387-25921-5. This can involve image data, for example, from epifluorescence microscopy, confocal microscopy, or multiphoton microscopy. The point spread function can be ascertained, for example, from the pupil function using methods known, for example from M. Leutenegger et al., "Fast focus field calculations", Opt. Express 14 (2006), 11277-11291.

Preferably, the imaging of the sample and the correcting of the image data captured by the imaging of the sample are carried out repeatedly. In this way, either multiple planes lying in the sample may be obtained to generate a three-dimensional image or multiple images of a single plane lying in the sample may be obtained to generate a video.

In one preferred embodiment, a tilt of the cover slip is determined by the microscope and the imaging error to be corrected is ascertained on the basis of the tilt. The tilt of the cover slip induces an asymmetrical imaging error which may only be corrected with difficulty solely using optical means, but may be corrected well digitally.

In one embodiment, the imaging of the sample is carried out in multiple scanning steps, in each of which a section of the sample is illuminated and/or excited to fluorescence. In each scanning step, only a punctiform section of the sample is illuminated and/or excited to fluorescence, for example by illumination using laser light.

An embodiment of the invention furthermore relates to a microscope, having a cover slip covering a sample, wherein the microscope comprises a device for digitally correcting an optical image of the sample. The device is designed to determine the index of refraction of an optical medium bordering the cover slip, a tilt of the cover slip (14), and/or the thickness of the cover slip, to ascertain the imaging error to be corrected in the form of a pupil function on the basis of the index of refraction of the optical medium, the tilt of the cover slip, and/or the thickness of the cover slip, and to digitally correct the image data captured by the imaging of the sample on the basis of the pupil function.

The microscope is, for example, a confocal microscope. Alternatively, the microscope can be a transmitted light microscope or an incident light microscope.

Further features and advantages of embodiments of the invention result from the following description, which explains in greater detail exemplary embodiments in conjunction with the appended figures.

FIG. 1 shows a microscope 10 as an exemplary embodiment. The microscope 10 has an objective 12, which is oriented onto a cover slip 14. The microscope 10 furthermore comprises a control unit 16, which is connected via an external cable 18 to the objective 12 and which actuates the various objective components. An optical medium 20, in which a sample is embedded and which is referred to hereinafter as the embedding medium 20, is located on the cover slip 14. Furthermore, an immersion medium 22 is introduced between the objective 12 and the cover slip 14.

Figure 2:
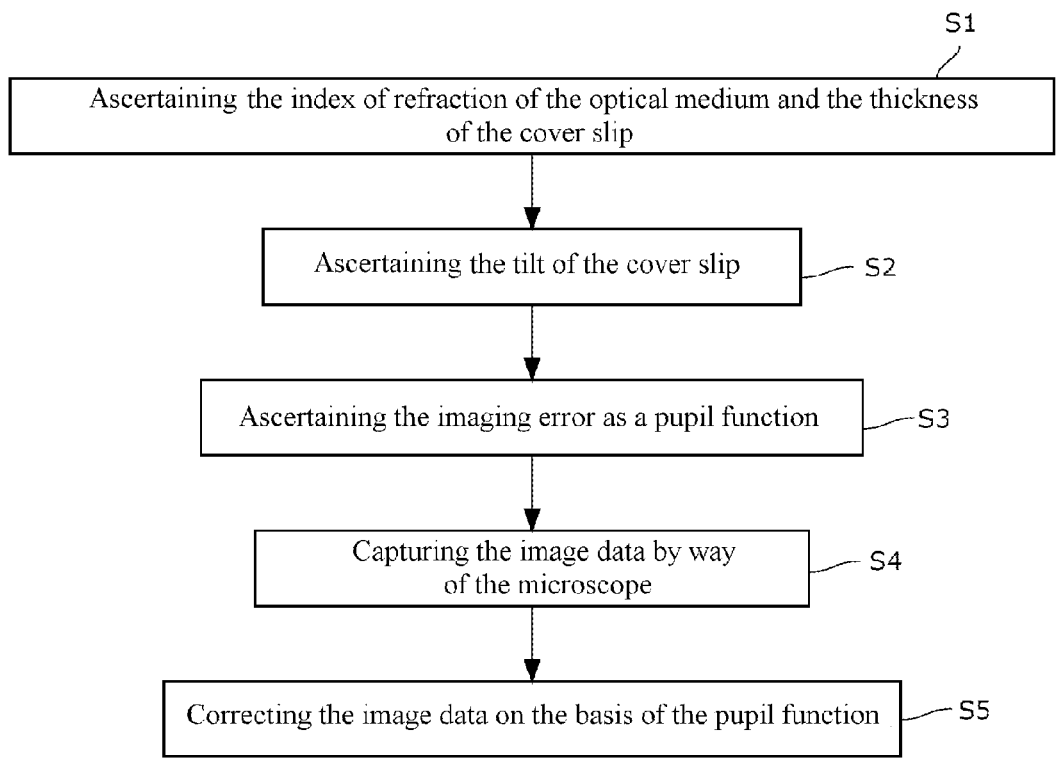
FIG. 2 shows a flow chart of an embodiment of a method for digitally correcting an optical image of a sample by means of the microscope according to FIG. 1

FIG. 2 shows a flow chart of an embodiment of the method according to the invention for digitally correcting an optical image of a sample by means of the microscope according to FIG. 1.

In a first step S1, first the thickness of the cover slip 14 along the optical axis O of the objective 12 is ascertained. For this purpose, for example, a measurement light beam is deflected by the objective 12 onto the cover slip 14 under oblique incidence. Two spatially separate reflection light beams are generated by partial reflections of the measurement light beam at a first optical interface formed by the cover slip 14 and the immersion medium 22 and at a second optical interface formed by the cover slip 14 and the embedding medium 20. The two reflection light beams are received by the objective 12 and deflected onto a position-sensitive detector. The thickness of the cover slip can be ascertained on the basis of the captured incidence locations of the two reflection light beams on the position-sensitive detector.

Furthermore, in first step S1, the index of refraction of the embedding medium 20 is ascertained. This can be carried out, for example, in that in addition to the incidence location, the respective intensities of the two reflection light beams are also captured by means of the position-sensitive detector. The index of refraction of the embedding medium 20 can be ascertained on the basis of the captured intensities of the two reflection light beams, since the intensities of the two reflection light beams are dependent on the reflection and the transmission of the measurement light beam at the two interfaces which are defined by the cover slip 14 and the embedding medium 20 or the immersion medium 22. The reflection and transmission processes on which the captured intensities of the two reflection light beams spatially separated from one another are based are thus essentially determined by the indices of refraction of the cover slip 14 and also of the embedding medium 20 and the immersion medium 22.

In a second step S2, a tilt of the cover slip 14 is ascertained. For this purpose, at least three measurement points which span a plane are defined, for example, on a surface of the cover slip 14. For each of the three measurement points, the following steps are carried out: deflecting a measurement light beam through the objective 12 on the measurement point; generating a reflection light beam in that the measurement light beam is at least partially reflected at the respective measurement point; deflecting the reflection light beam through the objective onto a position-sensitive detector; capturing the incidence location of the reflection light beam on the position-sensitive detector; and ascertaining the distance of the respective measurement point from the objective 12 along its optical axis O on the basis of the captured incidence location. Subsequently, a tilt of the plane spanned by the three measurement points relative to the optical axis O of the objective 12 is determined as the tilt of the cover slip 14 on the basis of the ascertained distances.

In a third step S3, the imaging error is determined from the thickness of the cover slip 14, the index of refraction of the embedding medium 20, and the tilt of the cover slip 14 in the form of a pupil function as $$\psi(r, \varphi) = \Delta z \sqrt{n_{Spc}^2 - r^2 NA^2} - (\Delta d + \Delta z)\sqrt{n_{Imm}^2 - r^2 NA^2} + \\ (d + \Delta d) \left[ \sqrt{\begin{array}{c} n_{Dgl}^2 - (rNA\cos\alpha\cos(\varphi - \varphi_0) - \\ \sin\alpha\sqrt{n_{Imm}^2 - r^2 NA^2})^2 - r^2 NA^2 \sin^2(\varphi - \varphi_0) \end{array}} - \\ rNA\sin\alpha\cos(\varphi - \varphi_0) - \cos\alpha\sqrt{n_{Imm}^2 - r^2 NA^2} \right] - \\ d\left[\sqrt{n_{Dgl}^2 - r^2 NA^2} - \sqrt{n_{Imm}^2 - r^2 NA^2}\right] \quad (1)$$

In this case, r is the radial coordinate of the exit pupil of the objective 12 scaled to the unit circle 12, φ are the angle coordinates of the exit pupil of the objective 12, z is a mechanical focal length, $n_{Spc}$ is the index of refraction of the embedding medium 20 bordering the cover slip 14, is the known index of refraction of the immersion medium 22 introduced between the objective 12 and the cover slip 14, Δd is the deviation of the thickness of the cover slip 14 along the optical axis O of the objective 12 from the nominal thickness of the cover slip 14, NA is the numerical aperture of the objective 12, $n_{Dgl}$ is the index of refraction of the cover slip 14, α is the azimuth of the tilt, and $\varphi_0$ is the polar angle of the tilt.

In a fourth step S4, image data are generated by the microscope 10 by imaging of the sample.

In a fifth step S5, the image data are corrected on the basis of the pupil function ψ(r,φ) according to above equation (1). For example, for this purpose a digital filter is generated from the pupil function ψ(r,φ) which quasi reverses the process of the imaging of the sample by the microscope 10 in order to correct the imaging error. Alternatively, a deconvolution of the image data by means of a point spread function obtained from the pupil function ψ(r,φ) is carried out for correcting the imaging error.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 microscope
12 objective
14 cover slip
16 control unit
18 cable
20 embedding medium
22 immersion medium
P1 arrow

The invention claimed is:

1. A method for digitally correcting an optical image of a sample by a microscope that has a cover slip covering the sample, the method comprising:
   determining, by the microscope, an index of refraction of an optical medium bordering the cover slip, a tilt of the cover slip, and/or a thickness of the cover slip;
   ascertaining an imaging error to be corrected in the form of a pupil function based on the index of refraction of the optical medium, the tilt of the cover slip, and/or the thickness of the cover slip;

carrying out imaging of the sample by the microscope; and digitally correcting image data captured by the imaging of the sample based on the pupil function.

2. The method as claimed in claim 1, further comprising generating a digital filter for correcting the image data captured by the imaging of the sample based on the pupil function.

3. The method as claimed in claim 2, further comprising reconstructing phase information of detection light emitted by the sample using the digital filter.

4. The method as claimed in claim 1, further comprising generating, by the imaging, an image of a plane lying in the sample, and correcting the image by an inversion of the imaging based on the pupil function.

5. The method as claimed in claim 1, further comprising generating a point spread function based on the pupil function, and performing a deconvolution operation by applying the point spread function on the image data captured by the imaging of the sample for correcting the imaging.

6. The method as claimed in claim 1, wherein the imaging of the sample and the correcting of the image data captured by the imaging of the sample are carried out repeatedly.

7. The method as claimed in claim 1, wherein the imaging of the sample is carried out in multiple scanning steps, in each of which a section of the sample is illuminated and/or excited to fluorescence.

8. The method as claimed in claim 1, wherein the optical medium is an embedding medium in which the sample is embedded.

9. The method as claimed in claim 1, wherein an immersion medium is arranged between an objective of the of microscope and the cover slip, and wherein the imaging error to be corrected is ascertained based on a known index of refraction of the immersion medium.

10. The method as claimed in claim 1, wherein determining, by the microscope, an index of refraction of an optical medium bordering the cover slip, a tilt of the cover slip, and/or a thickness of the cover slip comprises emitting at least one light beam from the microscope and measuring, via the microscope, a reflection of the at least one light beam.

11. A microscope, comprising:

a cover slip for covering a sample; and a device configured to digitally correct an optical image of the sample by:

determining an index of refraction of an optical medium bordering the cover slip, a tilt of the cover slip, and/or a thickness of the cover slip;

ascertaining the imaging error to be corrected in the form of a pupil function based on the index of refraction of the optical medium, a tilt of the cover slip, and/or the thickness of the cover slip; and digitally correcting image data captured by the imaging of the sample based on the pupil function.

12. The microscope as claimed in claim 11, wherein the microscope is a confocal microscope.

* * * * *